United States Patent [19]
Miwa et al.

[11] Patent Number: 6,059,730
[45] Date of Patent: May 9, 2000

[54] ULTRASONIC DIAGNOSIS APPARATUS INCLUDING A PHASE DIFFERENCE COMPUTING UNIT

[75] Inventors: Yuichi Miwa, Chouhu; Ryuichi Shinomura, Higashimatsuyama; Satoshi Tamano, Kashiwa, all of Japan

[73] Assignee: Hitachi Medical Corp., Tokyo, Japan

[21] Appl. No.: 09/202,661

[22] PCT Filed: Jun. 20, 1997

[86] PCT No.: PCT/JP97/02118

§ 371 Date: Dec. 18, 1998

§ 102(e) Date: Dec. 18, 1998

[87] PCT Pub. No.: WO97/48341

PCT Pub. Date: Dec. 24, 1997

[30] Foreign Application Priority Data

Jun. 21, 1996 [JP] Japan ................................. 8-161302
Dec. 10, 1996 [JP] Japan ................................. 8-329435

[51] Int. Cl.[7] ................................................ A61B 8/00
[52] U.S. Cl. .............................. 600/443; 600/447; 367/7
[58] Field of Search ................................ 600/437, 424, 600/443–449, 453–456, 442; 367/7, 11, 103; 73/602, 626, 628

[56] References Cited

U.S. PATENT DOCUMENTS

| | | | |
|---|---|---|---|
| 5,172,343 | 12/1992 | O'Donnell | 367/7 |
| 5,268,876 | 12/1993 | Rachlin | 367/7 |
| 5,331,964 | 7/1994 | Trahey et al. | 600/447 |
| 5,531,117 | 7/1996 | Fortes | 73/602 |

FOREIGN PATENT DOCUMENTS

| | | |
|---|---|---|
| 1-135333 | 5/1989 | Japan. |
| 1-227742 | 9/1989 | Japan. |
| 2-177949 | 7/1990 | Japan. |
| 7-303640 | 11/1995 | Japan. |

OTHER PUBLICATIONS

IEEE Transactions on Ultrasonics, Ferroelectrics, and Frequency Control, vol. 35, No. 6, Nov. 1988, "Phase Abberation Correction Using Signals From Point Reflectors and Diffuse Scatterers: Measurements", M. O'Donnell et al, pp. 768–774.

Journal of Acoustical Society of America, vol. 90, No. 6, Dec. 1991, "Measurements of ultrasonic pulse arrival time differences produced by abdominal wall specimens", Y. Sumino et al, pp. 2924–2930.

*Primary Examiner*—Marvin M. Lateef
*Assistant Examiner*—Ali M. Imam
*Attorney, Agent, or Firm*—Beall Law Offices

[57] ABSTRACT

To achieve a high resolution, by modifying a delay time distribution of received waves with correlation computations between signals from adjacent elements and by removing influences of inhomogeneities in a living body with a simple computing circuit for correlation factors. A time delay unit 2 for delaying receiving signals from a probe 1, an adder unit 3 for adding outputs of the time delay unit 2 and forming ultrasonic beam, a phase difference computing unit 5 for computing phase differences between signals and a correlation factor computing unit 6 for computing correlation factors are provided, the outputs of the correlation factor computing unit 6 are compared with values of a correlation factor storage unit 8 by a correlation factor comparing unit 9, and when the former is larger than the latter, the outputs of the phase difference computing unit 5 and the outputs of the correlation factor computing unit 6 are respectively stored in a phase difference storage unit 7 and the correlation factor storage unit 8, and at the moment when all of the phase difference computations have been completed, the time delay unit 2 is controlled by making use of the value stored in the phase difference storage unit 7. The phase difference computations and the correlation factor computations are complex number computation, and only when the real part of a complex number which is an object for the phase difference computation is positive, a sign judging unit 10 issues an operation command to the correlation factor comparing unit 9.

5 Claims, 8 Drawing Sheets

ULTRASONIC DIAGNOSIS APPARATUS INCLUDING A PHASE DIFFERENCE COMPUTING UNIT

TECHNICAL FIELD OF THE INVENTION

The present invention relates to a ultrasonic diagnosis device used for medical diagnosis, more specifically, to a ultrasonic diagnosis device capable of providing a high resolution ultrasonic slice image in which a delay time distribution of received signals of a probe is modified in order to remove influences of medium inhomogeneities in a living body.

TECHNICAL BACKGROUND

A ultrasonic diagnosis device provides a delay time distribution of received signals from a plurality of arrayed probe elements, forms ultrasonic beam having directivity to a predetermined direction and thereby constitutes a slice image of a body to be inspected. Since a human body is an inhomogeneous medium, it is necessary to vary the time delay distribution in accordance with a body to be inspected in order to form a high resolution ultrasonic beam.

The ultrasonic diagnosis device shown in FIG. 2 comprises probe elements 21 through 25 arranged at a predetemined position. The prove elements 21 through 25 transmit ultrasonic pulses to the body to be inspected and receive reflection pulses from the reflection member 61 disposed at opposition side of the body to be inspected. The reflection pulse signal is pulses that passed through the body to be inspected. For the sake of simplicity only signal receiving operation is explained. If a sound velocity in a medium is already known and uniform, a reflection pulse wave front from the reflection member 61 arrives to the probe elements 21 through 25 as an ideal wave front, and in this instance, due to the positional relationship between the reflection member 61 and the elements 21 through 25, the pulse wave front arrives earliest to the element 23 disposed near the reflection member 61 and arrives latest to the elements 21 and 25 far from the reflection member.

To improve the detection precision, it is necessary to manage the arrival time of all of the pulses to be at the same time, therefore, a proper delay is provided for the pulses received by the elements 22, 23 and 24. With this measure arrival time of all of the pulses is matched and thereafter by adding these pulses, only the received pulses from an aimed direction are amplified and, thereby a high resolution slice image is constituted. In this instance, if the body to be inspected is a homogeneous medium and the sound velocity therein is already known, a delay time to be provided is analytically obtained.

Now, when assuming that distances between the elements 21 through 25 are $Li$ ($1 \leq i \leq 5$), a preset sound velocity of the ultrasonic diagnosis device is c, delay times to be provided for the elements 21 through 25 are $\tau i$($1 \leq i \leq 5$) and the maximum distance among $Li$ ($1 \leq i \leq 5$) is Lmax, the delay time $\tau i$ is expressed by the following equation (1):

$$\tau i = (L\max - Li)/c \quad (1)$$

Delay time 0 is provided for the elements 21 and 25 having the longest distance, the maximum delay time is provided for the element 23 having the shortest distance and proper delay times between the above two values are provided for the other elements 22 and 24 depending on the distances from the reflection member 61.

However, in practice there exists an inhomogeneous medium 64 between the elements 21 through 25 and the reflection member 61, therefore, the pulse wave front assumes a distorted wave front 63. Accordingly, the above delay time $\tau i$ is optimum as an initial delay time to be provided for the received signals of the respective elements, however, in order to obtain a high resolution slice image it is further necessary to provide a correction amount of delay time in view of the distorted wave front 63 for the above initial delay time. Further, in practice, a human body includes a variety of media such as muscle, fat and viscera, therefore, a further complex pulse wave front 63 is formed.

JP-A-1-135333 and IEEE Transactions on Ultrasonics, Ferroelectrics, and Frequency Control, Vol. 35, No. 6, November 1998, pp768–774 disclose a technical measure in which phase differences between signals of adjacent elements are determined by computing correlation between the signals of adjacent elements and the determined phase differences are used as the correction values for the above initial delay time.

In order to determine how far two signals having similar forms are separated, it is possible to determine the same by observing the correlation thereof. All of correlation factors are calculated by performing multiplications while shifting the signals, and based on a calculation of the shifting amount which shows the maximum correlation factor how the pulse waves are separated can be judged.

When determining the phase differences between the signals of adjacent elements by computing correlations therebetween, accurate phase differences are determined in a region where the correlation factors between signals are large, thereby a highly accurate correction can be effected. On the other hand, in a region where the correlation factors between the signals are small, the determined phase differences are inaccurate and the correction accuracy is reduced. Namely, it is necessary to use the phase differences which are computed in the region having a large correlation factor as the correction value for the initial delay time. However, the above patent and technical documents disclose no mechanism which feeds back the phase differences computed in a region having a high correlation as correction values for the initial delay time.

An object of the present invention is to resolve the above task and to provide a ultrasonic diagnosis device capable of obtaining a high resolution slice image and having a simple correlation factor computing circuit in which in order to remove influences of inhomogeneous medium in a living body a delay time distribution of received signals is modified by computing correlations between signals of adjacent elements as well as phase differences between the signals computed for a region having high correlations of the signals are automatically used as correction values for initial delay time distribution.

DISCLOSURE OF THE INVENTION

In order to achieve the above object, a ultrasonic diagnosis device according to the present invention comprises at least a probe constituted by arrayed elements disposed at a predetermined position which transmit ultrasonic pulses at least into a body to be inspected and receive the same therefrom, a time delay unit which provides a time delay to received wave signals for the respective elements of the probe, and an adder unit which forms ultrasonic beam by adding output signals from the time delay unit, is characterized in that the ultrasonic diagnosis device further comprises, a phase difference computing unit which computes phase differences between the output signals from the time delay unit; a correlation factor computing unit which computes correlation factors between the output signals from the time delay unit; a computing region input unit which designates a portion of the output signals as an object of the computations of the phase differences and of the correlation factors; a phase difference storage unit and a correlation factor storage unit in which respectively store the results of the phase difference computation and the correlation factor computation; and a correlation factor comparing unit which compares an output value of the correlation factor computing unit with a stored value in the correlation factor storage unit, and when the output value of the correlation factor computing unit is larger than the stored value in the correlation factor storage unit, causes the phase difference storage unit and the correlation factor storage unit to store respectively the output value of the phase difference computing unit and the output value of the correlation factor computing unit, and is further characterized in that, at the moment when the phase difference computation and the correlation factor computation for the portion of the output signals designated by the computing region input unit have been completed, the time delay unit is controlled by making use of the output value stored in the phase difference storage unit.

The ultrasonic diagnosis device according to the resent invention, is further characterized in that, the phase difference computation and the correlation factor computation are complex number computation and the ultrasonic diagnosis device further comprises a sign judging unit which is connected to the phase difference computing unit (5 in FIG. 1) and issues an operation command to the correlation factor comparing unit only when the sign judging unit judges that the real part of complex numbers as an object of the phase difference computation is positive.

With the above measure, in order to remove influences due to inhomogeneities in a living body, the delay time distribution of received signals can be modified by the correlation computation between the signals of adjacent elements and by making use of automatically the phase differences of the signals computed for a region showing a high correlation of the signals as the correction values for the initial delay time distribution, and a ultrasonic diagnosis device having a simple computing circuit of the correlation factors is as well realized.

DETAILED DESCRIPTION OF THE PREFERRED EMBODIMENTS

Figure 3:
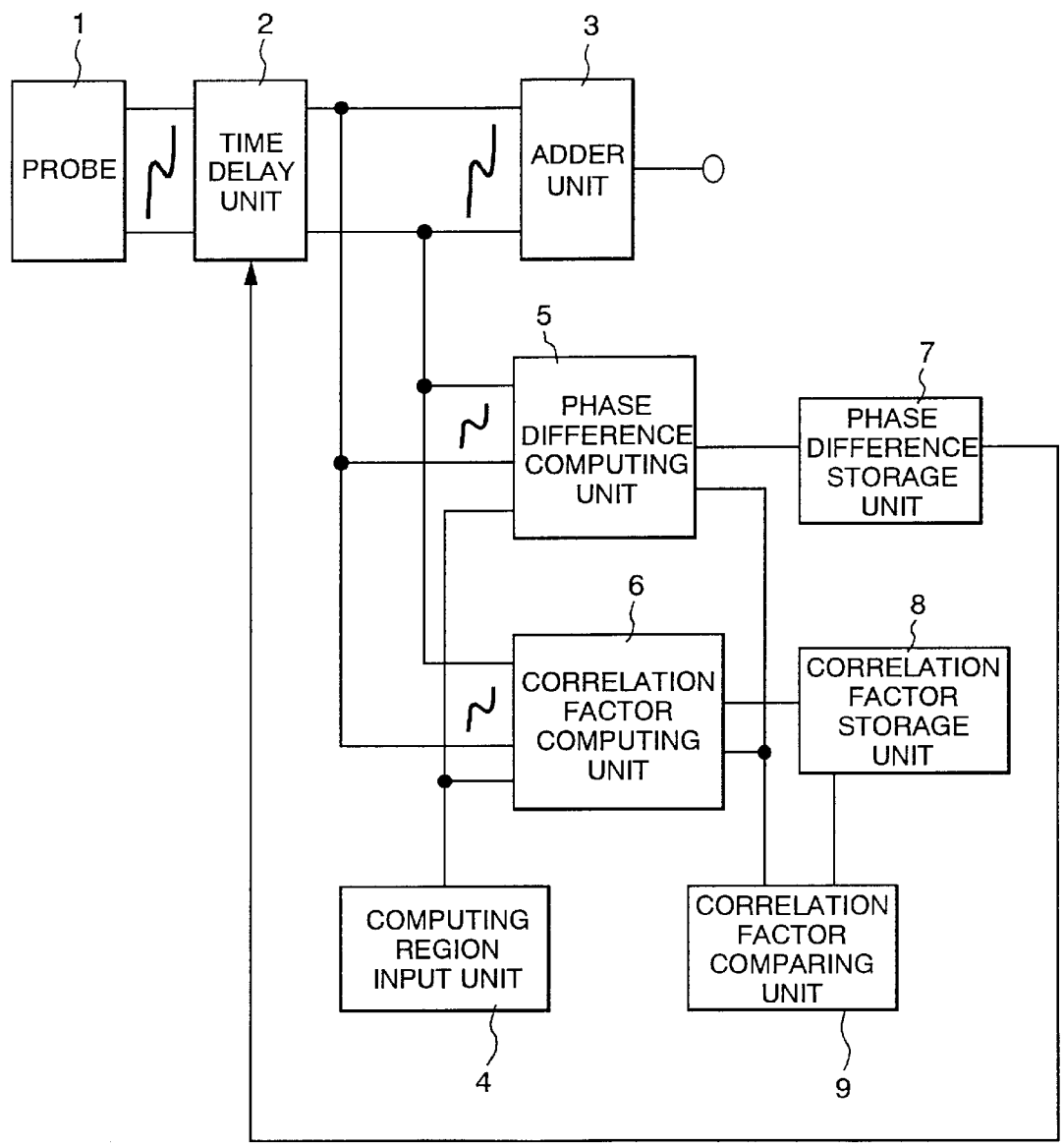
FIG. 3 is a constitutional diagram of a ultrasonic diagnosis device showing a first embodiment according to the present invention

FIG. 3 is a constitutional diagram of a ultrasonic diagnosis device showing a first embodiment according to the present invention.

Now, when determining the phase differences between the signals of adjacent elements by computing correlations therebetween, accurate phase differences are determined for a region where the correlation factors between signals are large, thereby a highly accurate correction can be effected. On the other hand, for a region where the correlation factors between the signals are small, the determined phase differences are inaccurate and the correction accuracy is reduced. Namely, it is necessary to use the phase differences which are computed for the region having a large correlation factor as the correction value for the initial delay time.

In FIG. 3, the ultrasonic diagnosis device comprises a probe 1 which is designed to receive reflection waves from a reflection member, a time delay unit 2 which is designed to cause a delay for the reflection waves, an adder unit 3 which is designed to form ultrasonic beam, a computing region input unit 4 which is designed to permit inputting of a region of interest, a phase difference computing unit 5 which is designed to compute separation between reflection waves, a correlation factor computing unit 6 which is designed to compute correlation factors between adjacent reflection waves, a phase difference storage unit 7, a correlation factor storage unit 8, and a correlation factor comparing unit 9 which is designed to compare the correlation factors. Further, in an actual ultrasonic diagnosis device an amplifier unit, a wave detection unit, a display unit and the like are included in addition to the above units, however, for the sake of simplicity illustration thereof is omitted.

Figure 4:
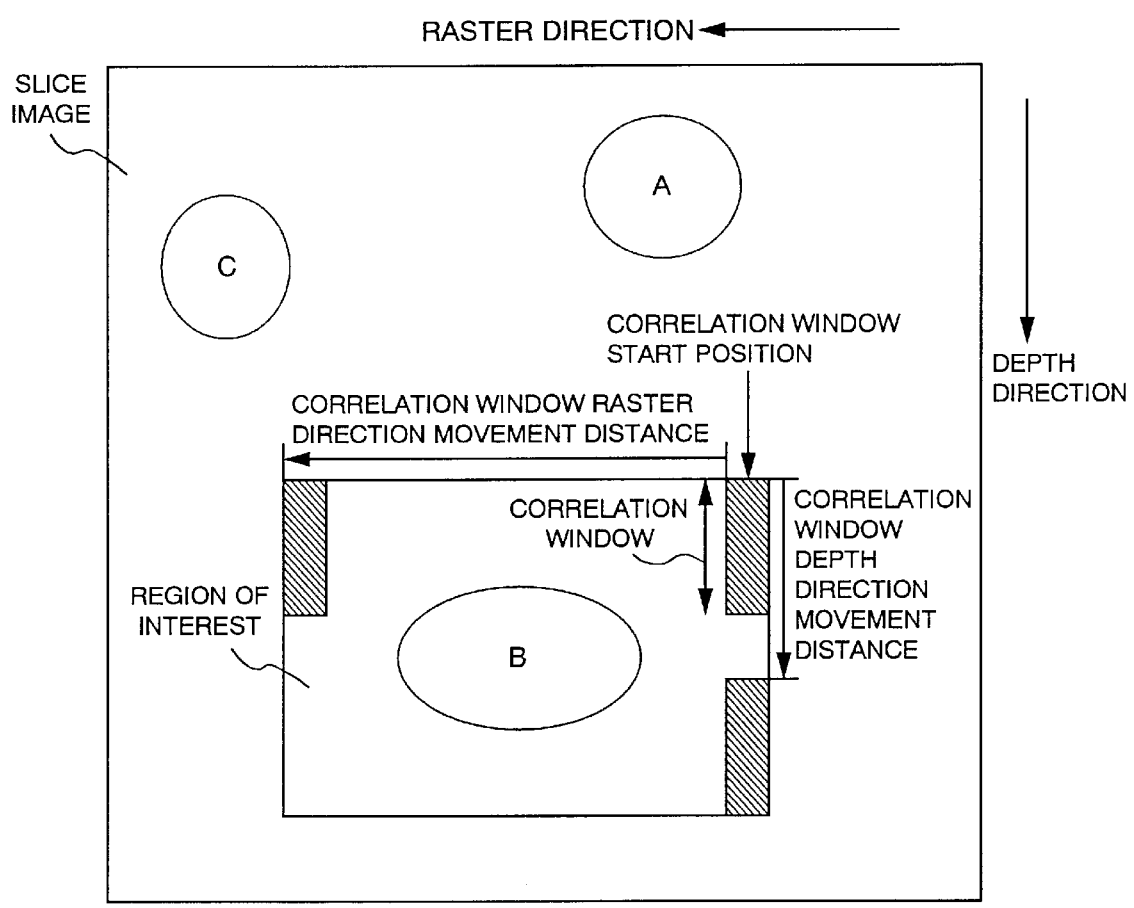
FIG. 4 is a view for explaining a method of designating a region of interest which constitutes an object for correction of an initial delay time according to the present invention.

Element signals from the probe 1 are independently provided with an initial delay time at the time delay unit 2. An initial delay time is a delay time when being assumed that a living body is a homogeneous medium and the sound velocity therein is already known, however, there exist inhomogeneities in the living body, it is necessary to correct the initial delay time. A method of determining correction values of the initial delay time based on correlation computations between signals of adjacent elements is explained in detail in the IEEE Transactions on Ultrasonics, Ferroelectrics, and Frequency Control, Vol.35, No.6, November 1998, pp768–774. FIG. 4 is a diagram illustrating a method of designating a region of interest representing an object for correction of the initial delay time according to the present invention.

First of all, a user of the device designates a region of interest representing an object for correction of the initial delay time. The designation is performed, by inputting, for example, four parameters of a correlation window, a correlation window starting position, a correlation window depth direction movement distance and a correlation window raster direction movement distance as illustrated in FIG. 4 through the computing region input unit 4. Now, if it is assumed that there are three tissues A, B and C in a slice image, and when a tissue of interest is B, the user of the device designates correlation window, the correlation window start position, the correlation window depth direction movement distance and the correlation window raster direction movement distance as illustrated in FIG. 4. Herein, the correlation window is a signal length in depth direction which is necessary for determining one phase difference and correlation factor. Namely, since a reflection wave from a reflection member is not wave-shaped in comparison with a transmission wave, with the provision of take-up windows at a plurality of locations correlations at the respective windows are computed. Therefore, the correlation window has a longitudinal size of one take-up window, and then one correlation factor and phase difference are calculated for every one correlation window. The initial position of the correlation window corresponds to the correlation window start position which can be designated by a raster and depth. The movement distance in depth direction from the start position which is necessary for the correlation window to move the region of interest is the correlation window depth direction movement distance, and the movement distance in raster direction is the correlation window raster direction movement distance.

Figure 5:
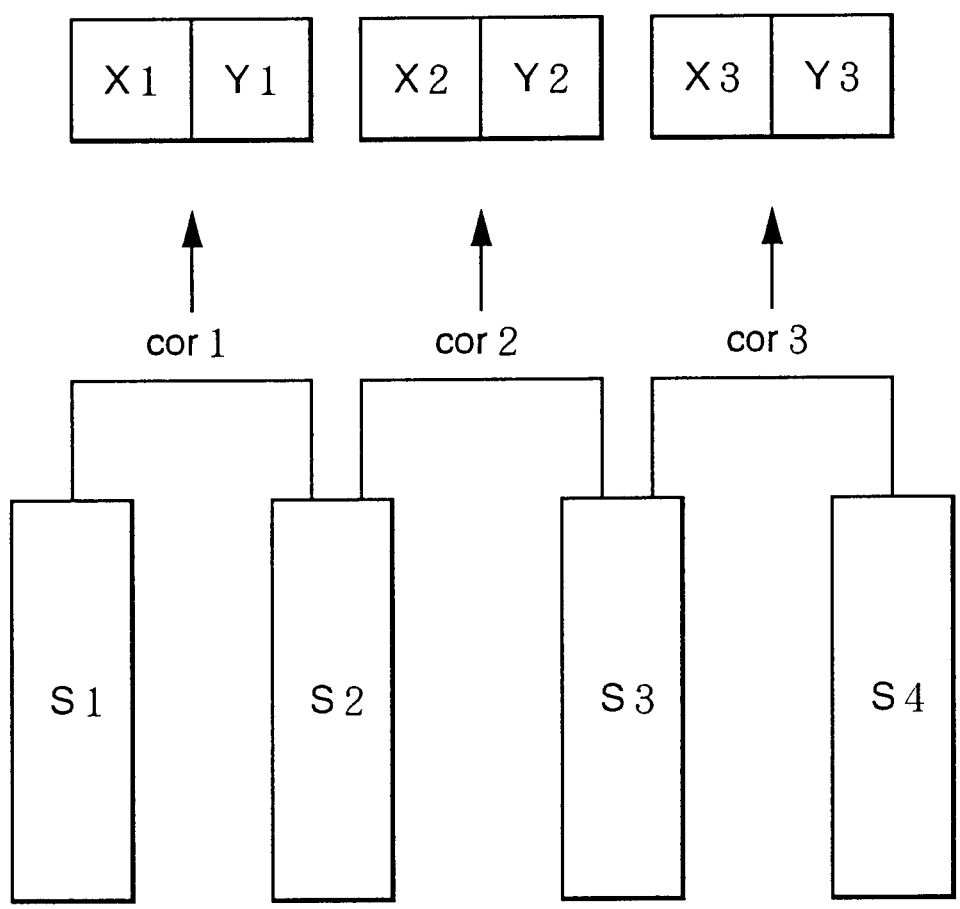
FIG. 5 is a diagram for explaining correlation computations in the ultrasonic diagnosis device as shown in FIG. 3.
Figure 6:
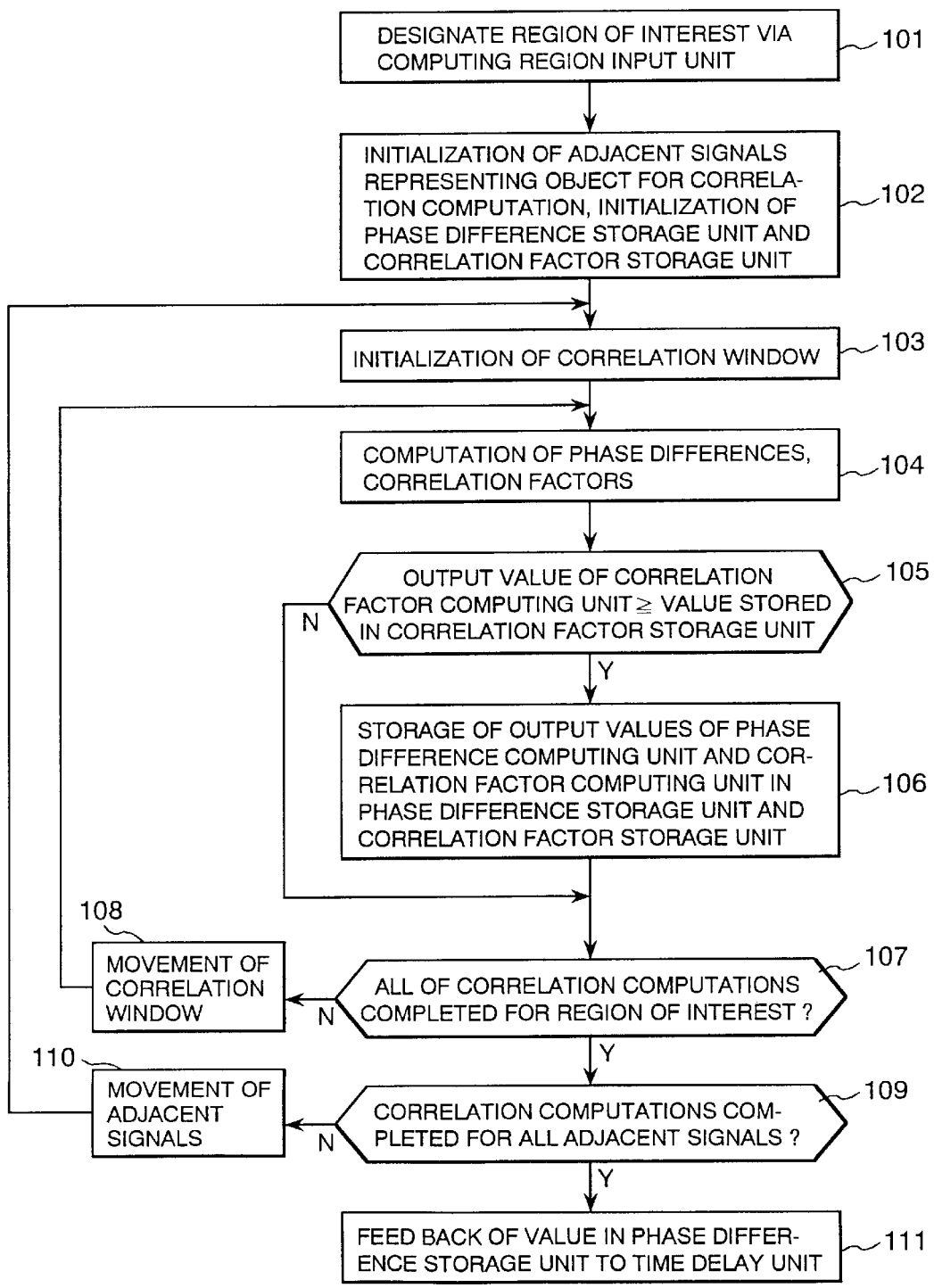
FIG. 6 is an operation flow chart performed in the ultrasonic diagnosis device as shown in FIG. 3 when determining phase differences necessary for correcting inhomogeneities in a living body while moving a correlation window prior to moving adjacent signals.

FIG. 5 is a diagram for explaining the correlation computation of the ultrasonic diagnosis device shown in FIG. 3, and FIG. 6 is an operation flow chart of the device for determining the phase differences which are necessary for the correction according to the present invention.

These drawings show an instance wherein prior to processing the adjacent signals (from s1 to s2, from s2 to s3) phase differences necessary for correcting inhomogeneities in a living body are determined while moving the correlation window (movement of the correlation window in FIG. 4 in the depth direction and in the raster direction).

Operations after a region of interest is designated are explained with reference to FIGS. 5 and 6. In FIG. 5, for the sake of simplicity number of output signals of the time delay unit 2 is assumed as 4, and respective signals are designated as s1, s2, s3 and s4. Number of phase differences between adjacent signals which is necessary for the correction is (number of output signals-1), namely 3 which are determined by the phase difference computation of s1 and s2, s2 and s3 and s3 and s4, and the correlation factor computation thereof. Hereinbelow, the phase difference computation and the correlation factor computation are inclusively called as correlation computation. As shown in FIG. 5, the respective correlation computations are designated as cor1, cor2 and cor3. In this instance, the phase difference storage unit 7 and the correlation factor storage unit 8 have to be constituted respectively to be able to store at least three phase differences and correlation factors corresponding to cor1, cor2 and cor3. The phase differences determined by cor1, cor2 and cor3 are respectively stored in memories X1, X2 and X3 in the phase difference storage unit 7, and the correlation factors determined in the same manner are respectively stored in memories Y1, Y2 and Y3 in the correlation factor storage unit 8.

As illustrated in FIG. 6, after designating a region of interest (step 101), an initialization of adjacent signals is performed which are the object for the correlation computation (step 102). This initialization implies a setting operation so that the phase difference computing unit 5 and the correlation factor computing unit 6 perform the computation of cor1. Further, all of the memories in the phase difference storage unit 7 and the correlation factor storage unit 8 are initialized (step 102). This initialization is realized by inputting zero, for example, for the memories X1 through X3 and the memories Y1 through Y3.

Subsequently, the correlation window is initialized (step 103). This initialization implies a setting of the correlation window at the correlation window start position as illustrated in FIG. 4. Then, the phase difference computing unit 5 and the correlation factor computing unit 6 perform the correlation computations for the designated adjacent signals (step 104). The correlation factor comparing unit 9 compares the output value of the correlation factor computing unit 6 with the value stored in the memory Y1 in the correlation factor storage unit 8 (step 105).

At this instance, when the output value of the correlation factor computing unit 6 is larger than the value stored in the memory Y1, the output value of the phase difference computing unit 5 is stored in the memory X1 in the phase difference storage unit 7, and the output value of the correlation factor computing unit 6 is stored in the memory Y1 in the correlation factor storage unit 8 (step 106). The above correlation computations as well as the storage of the phase differences and the correlation factors are repeated (step 107), while moving the correlation window within the region of interest (step 108). As a result, a phase difference necessary for correcting s2 with reference to s1 at a correlation window showing the largest correlation factor in the region of interest is stored in the memory X1.

The correlation computations of cor2 and cor3 are successively performed in the same algorism (step 110), and when all of the operations have been completed (step 109), phase differences necessary for the correction of the output signals sl through s4 from the time delay unit 2 are stored in the memories X1 through X3 in the phase difference storage unit 7. Thereafter, the values in the phase difference storage unit 7 are fed back to the time delay unit 2 (step 111). The output signal of the time delay unit 2 is corrected by the phase difference between two signals having the maximum correlation factor and the ultrasonic slice image at that moment shows a high resolution.

Further, in the operation flow chart in FIG. 6, if the initialization of the correlation factor storage unit 8 is performed at the same time as the initialization of the correlation window, it will be sufficient if the correlation factor storage unit 8 can store at least one correlation factor.

Figure 7:
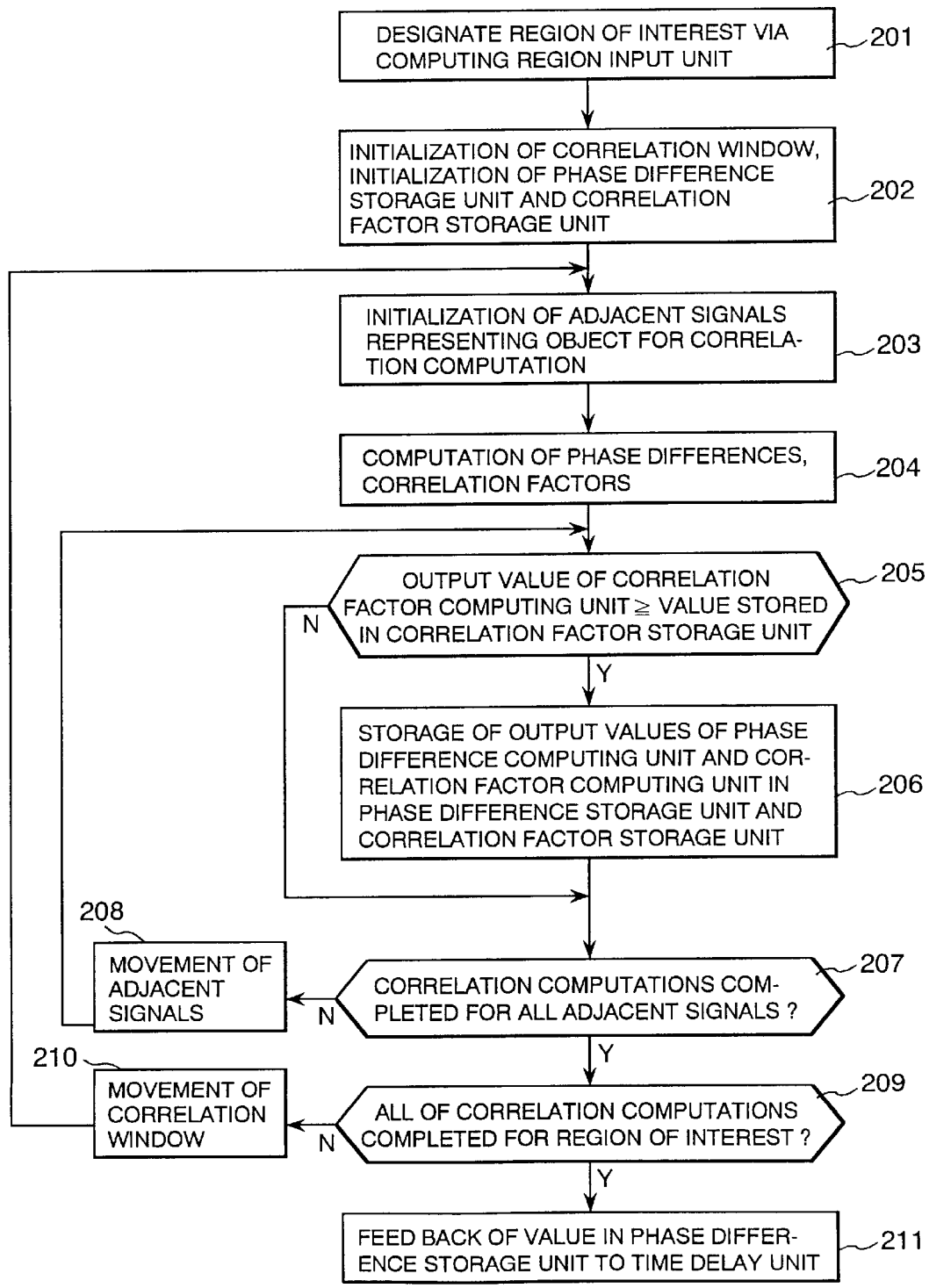
FIG. 7 is an operation flow chart performed in the ultrasonic diagnosis device as shown in FIG. 3 when determining phase differences necessary for correcting inhomogeneities in a living body while moving adjacent signals prior to moving a correlation window.

FIG. 7 is another operation flow chart for determining phase differences necessary for the correction according to the present invention.

In FIG. 6 algorism, after performing all of the correlation computations in the region of interest with regard to specific adjacent signals, the adjacent signals of the object for the correlation computation are varied to others. However, it is possible to move one correlation window after performing the correlation computation between all of the adjacent signals with the one correlation window.

FIG. 7 shows an algorism for performing such alternative. Further, in the algorism shown in FIG. 7, the phase difference storage unit 7 and the correlation factor storage unit 8 have to be constituted to be able to store at least (number of output signals-1) phase differences and correlation factors. FIG. 7 algorism is suitable when there exist (number of output signals-1) correlation computing circuits in parallel.

In FIG. 7, after designating a region of interest (step 201), the correlation window is initialized as well as all of the memories in the phase difference storage unit 7 and the correlation factor storage unit 8 are initialized (step 202). Subsequently, adjacent signals of an object for the correlation computation are initialized (step 203).

Subsequently, the correlation computation for designated adjacent signals is performed by the phase difference computing unit 5 and the correlation factor computing unit 6 (step 204), and the correlation factor comparing unit 9 compares the output value of the correlation factor computing unit 6 with the value stored in the memory Y1 in the correlation factor storage unit 8 (step 205). The output value of the correlation factor computing unit 6 is stored in the memory X1 in the phase difference storage unit 7, and the output value of the correlation factor computing unit 6 is stored in the memory Y1 of the correlation factor storage unit 8 (step 206). In the present embodiment, then the above correlation computations as well as storage of the phase differences and the correlation factors are repeated while shifting the adjacent signals (step 208). When the correlation computations for all of the adjacent signals have been completed (step 207), thereafter, while moving the correlation window within the region of interest (step 210), the correlation computations are repeated for all of the region of the interest, and all of the correlation computations for the region of interest have been completed (step 209), the values stored in the phase difference storage unit 7 are fed back to the time delay unit 2 (step 211).

The above correlation computations can be performed either directly for the received signal waves or for the received signal waves after subjecting the same to complex conversion with an orthogonal mixer. The details of the direct correlation computation for the received signal waves are, for example, explained in the IEEE Transactions an Ultrasonics, Ferroelectrics, and Frequency Control, Vol.35, No.6, November 1998, pp768–774. The details of the correlation computation for the received signal waves after being subjected to complex conversion are, for example, explained in JP-A-1-135333. Because of such as a small circuit scale and a short computation time it is preferable to perform the correlation computations for the signals after being subjected to complex conversion.

In the complex correlation computation, mathematical formulas for determining the phase differences and the correlation factors in one correlation window are, for example, expressed by the following two mathematical formulas (2) and (3). Formula (2) expresses the phase differences and formula (3) expresses the correlation factors. In the formulas (2) and (3), N represents number of data in the correlation window, ak and bk ($1 \leq k \leq N$) represent adjacent signals, * represents complex conjugate, real represents real part of a complex number and imag represents imaginary part of a complex number.

$$\operatorname{atan}\left(\frac{\sum_{K=1}^{N} imag(a_k b_k^*)}{\sum_{K=1}^{N} real(a_K b_K^*)}\right) \quad (2)$$

As will be seen from the above, the mathematical formula representing the phase differences is expressed by an arc tangent.

$$\frac{\left|\sum_{K=1}^{N} a_K b_K^*\right|}{\sqrt{\sum_{K=1}^{N} |a_K| \sum_{K=1}^{2N} |b_K|^2}} \quad (3)$$

As will be seen from the above, the mathematical formula representing the correlation factors is expressed by a division of a multiplication of adjacent signals with a square root of a product of respective squared adjacent signals.

The correlation factors can be also expressed by the following mathematical formulas (4) and (5). Namely, squaring both the denominator and numerator of the formula (3) corresponds to the formula (4), and omission of the denominator of the formula (3) corresponds to the formula (5). Since a computing circuit being required of such as square root and division computation becomes complex, therefore, if such as square root computation and denominator in a mathematical formula are omitted, a computing circuit is simplified. Therefore, computing circuits for the mathematical formulas (4) and (5) are simplified in comparison with that for the mathematical formula (3).

$$\frac{\left|\sum_{K=1}^{N} a_K b_K^*\right|^2}{\sum_{K=1}^{N} |a_K| \sum_{K=1}^{2N} |b_K|^2} \quad (4)$$

$$\left|\sum_{K=1}^{N} a_K b_K^*\right|^2 \quad (5)$$

Further, the premise for the mathematical formulas (2) through (5) is digital signal processing.

As explained previously, at the moment when the correlation computations between all of the adjacent signals in the entire region of interest have been completed, the initial delay time of the time delay unit 2 is corrected by making use of the phase differences of (number of output signals–1) which are stored in the phase difference storage unit 7. Further, the initial delay time to be corrected can be limited to that in the region of interest as illustrated in FIG. 4 as well as can extend to that of the entire slice image which corresponds to the entirety of FIG. 4. Namely, since the correlation factors are computed in the region of interest, precisely it will be sufficient if the initial delay time in the region of interest is corrected by the phase difference when the corresponding correlation factor shows the maximum, however, it is possible there are no changes in the correction value over the entire slice image, in such instance the initial delay time in the entire slice image can be corrected with the above phase difference.

The signals of which delay time are corrected are added in the adder unit 3 to form ultrasonic beam. For example, number of regions of interest corresponding to the number of rasters can be determined by setting the correlation window start positions at respective start points of the rasters, the correlation window depth direction movement distance down to the entire depth and the correlation window raster direction movement distance by one raster. Thereafter, if the initial delay times in the respective regions of interest are corrected by the concerned phase difference determined for the respective corresponding regions of interest, a dynamic correction can be effected to every rester in the slice image. A point to be paid an attention in such instance is that if a region of interest is narrowed, a region having a large correlation factor disappears in the region of interest and it is possible to output an inaccurate phase difference. A method of preventing such problem is considered to introduce an algorism in which a lower limit of the correlation factor is set, and after completing all of the correlation computations for the entire regions of interest, adjacent signals of which correlation factor stored in the correlation factor storage unit 8 shows below the lower limit are to be indicated and if such indication appears, no correction is performed for the adjacent signals.

Figure 8:
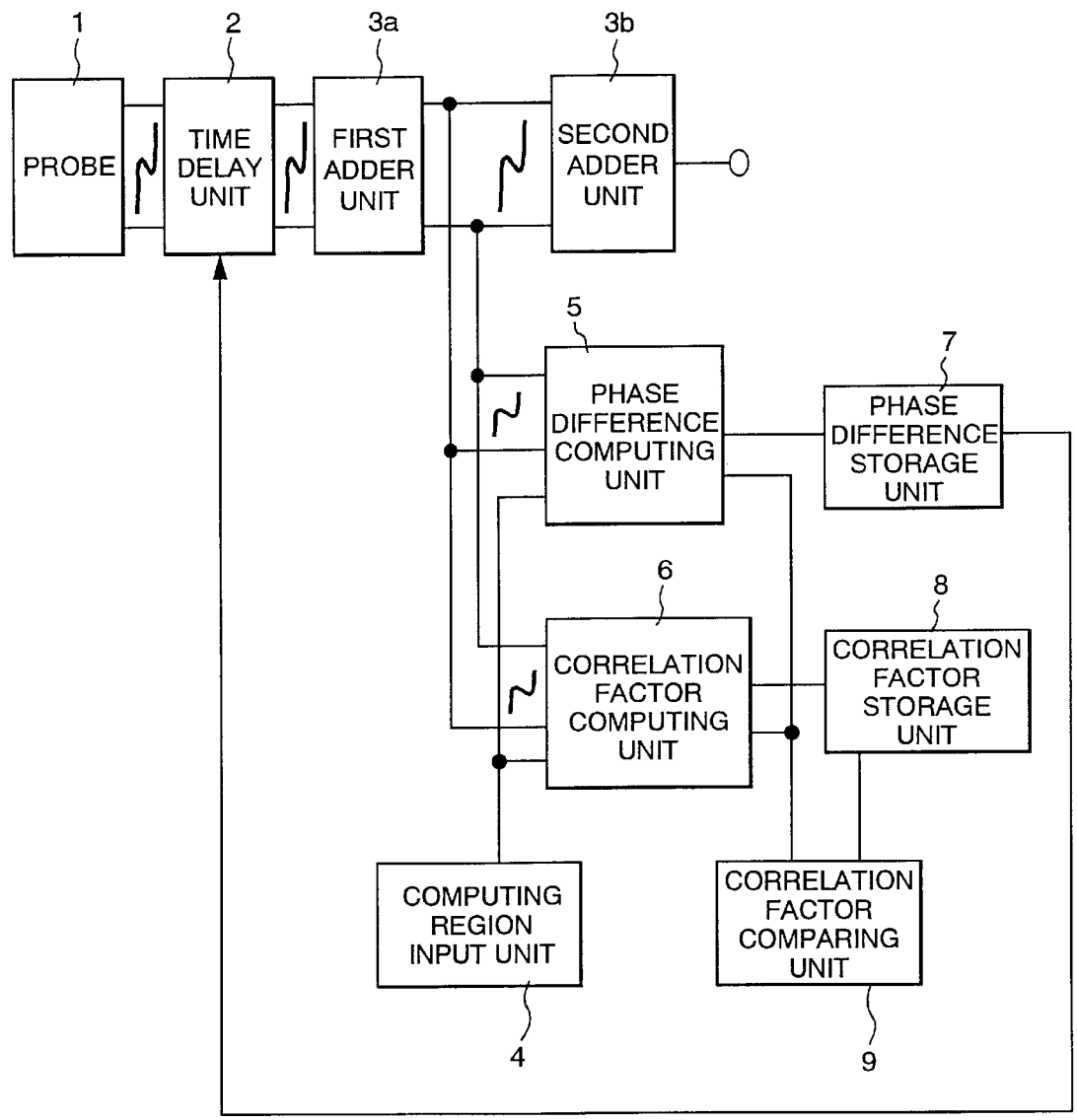
FIG. 8 is a constitutional diagram of a ultrasonic diagnosis device showing a second embodiment according to the present invention.

FIG. 8 is a constitutional diagram of a ultrasonic diagnosis device showing a second embodiment according to the present invention.

In FIG. 8, the ultrasonic diagnosis device comprises a probe 1, a time delay unit 2, a first adder unit 3a, a second adder unit 3b, a computing region input unit 4, a phase difference computing unit 5, a correlation factor computing unit 6, a phase difference storage unit 7, a correlation factor storage unit 8 and a correlation factor comparing unit 9.

In FIG. 8 embodiment, the correlation computations are performed after bundling the output signals of the time delay unit 2 by the first adder unit 3a. Journal of Acoustical Society of America, Vol.90, No.6, pp.2924–2931 (Published in 1991) and Ultrasonic Imaging, Vol.14, pp398–414 (Published in 1992) report that an interval of inhomogeneities in a living body is, in general, sufficiently larger than the element width of the probes. Therefore, if the interval of the signals after being bundled is fully sufficiently small in comparison with the interval of inhomogeneities of the living body, it is considered the correction accuracy would not be changed even if the correlation computation is performed after bundling the signals. In the constitution shown in FIG. 8, the circuit scale necessary for the correlation computation is reduced, and further even if a response from a specific element is lost, when at least one of element responses bundled by the first adder unit is alive, the correction value can be determined accurately. Further, the correlation computation algorism shown in FIG. 3 (in other words, the operation flows as shown in FIGS. 6 and 7) can be applied to FIG. 8 embodiment as it is only by replacing the adjacent element signals with the adjacent bundled signals. Finally, the signals of which delay time is corrected are added to the second adder unit 3b to form ultrasonic beam.

Now, since a ultrasonic slice image changes in real time, it is necessary to renew the value stored in the phase difference storage unit depending on time while fixing the region of interest. Such renewal can be realized by executing the flow charts shown in FIGS. 6 and 7 while holding the parameters which designate the region of interest in the computing region input unit 4. Namely, when a medical doctor uses the device of the present embodiment during inspection, since the images of a same place vary in a short time, the correction value has to be renewed while fixing the region of interest. Conceivable renewal timings of the value stored in the phase difference storage unit 7 are one performed at every time when the user of the device designates and another performed automatically with a predetermined time interval which is set in advance for the device.

As an alternative, it is possible to eliminate the computing region input unit 4 and to always select the entire slice image as the object for the correlation computation without designating a region of interest. In such instance, since the user is not required to designate a region of interest, the operation of the device is simplified and facilitated. However, it is necessary to renew the value stored in the phase difference storage unit 7 depending on time, therefore, if a time interval for the renewal is set in advance for the device, the inhomogeneities in a living body is fully automatically corrected.

Further, in case when only one inhomogeneous medium is included, a specific numerical value can be presented which can correct accurately the inhomogeneous sound velocity in the living body. However, actually there exist a plurality of inhomogeneous media in a living body as explained previously, in addition, these media are complicatedly combined each other, it is impossible to demonstrate numerically the effect of the correction. However, it is visibly recognized that a slice image subjected to the correction according to the present invention shows a high resolution in comparison with a slice image not subjected to the correction and therefore, the advantage of the present invention can be proved.

When there are no regions having a high correlation between signals in a region of interest, the detected phase differences between the signals are inaccurate. In the first and second embodiments as shown in FIGS. 3 and 8, the method of preventing such problem is employed in which a lower limit of the correlation factor is set, and after completing all of the correlation computations for the entire regions of interest, adjacent signals of which correlation factor stored in the correlation factor storage unit 8 shows below the lower limit are to be indicated.

However, the premise of this method is that the correlation factors are computed according to the formula (3). Since the correlation factors computed according to the formula (5) are not normalized by the auto correlation factors of the signals, the correlation factors are automatically enlarged with regard to signals having a large amplitude, therefore, it is not necessarily true that the signals in a region having large correlation factors have a high correlation each other.

In other words, if a circuit for computing the correlation factors is simplified, a problem arises that the magnitude of the correlation factors does not necessarily correspond to the level of correlation between the signals.

Accordingly, in order to resolve the above problem, the inventors propose a third embodiment.

Figure 1:
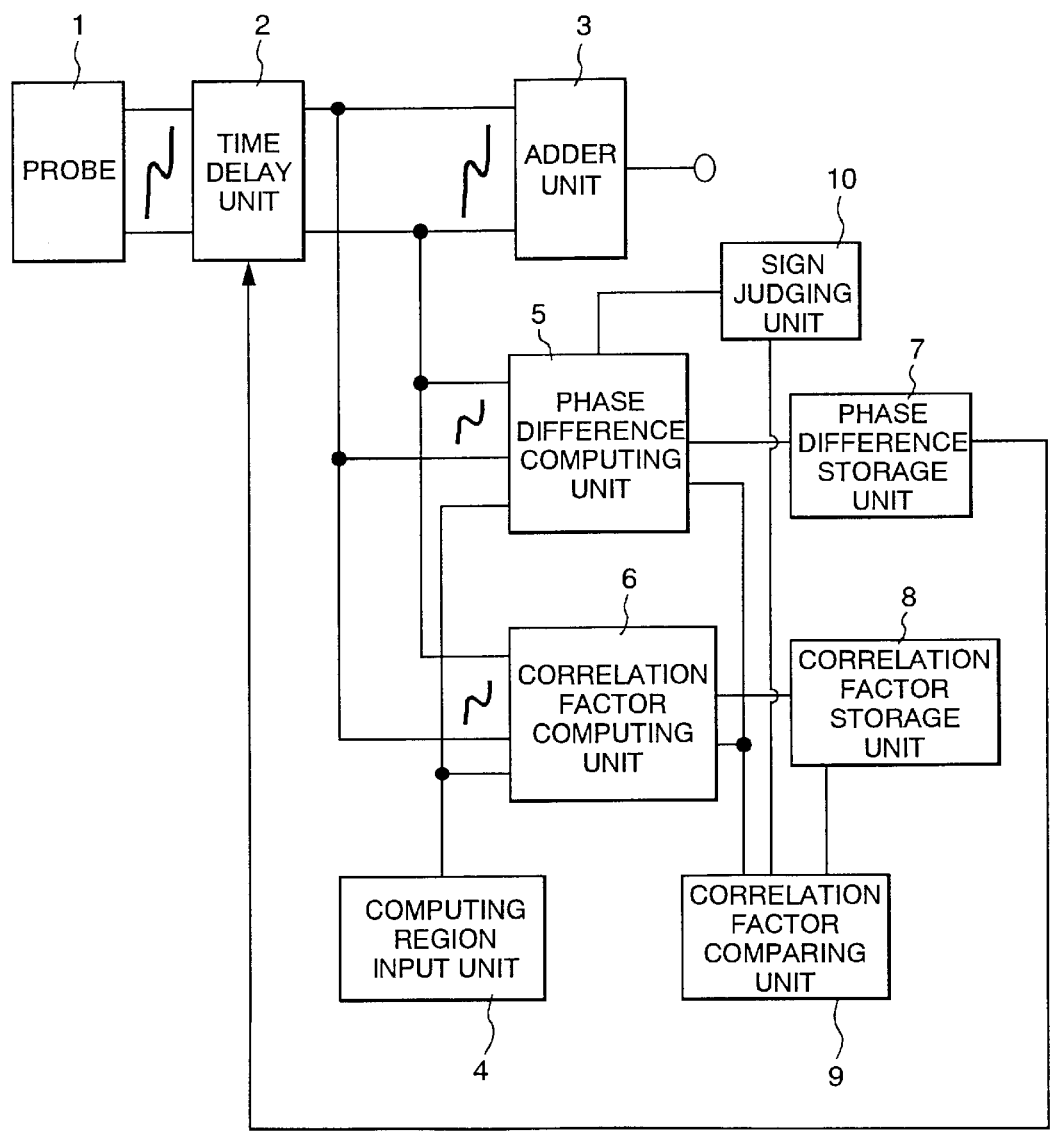
FIG. 1 is a constitutional diagram of a ultrasonic diagnosis device showing a third embodiment according to the present invention.
Figure 2:
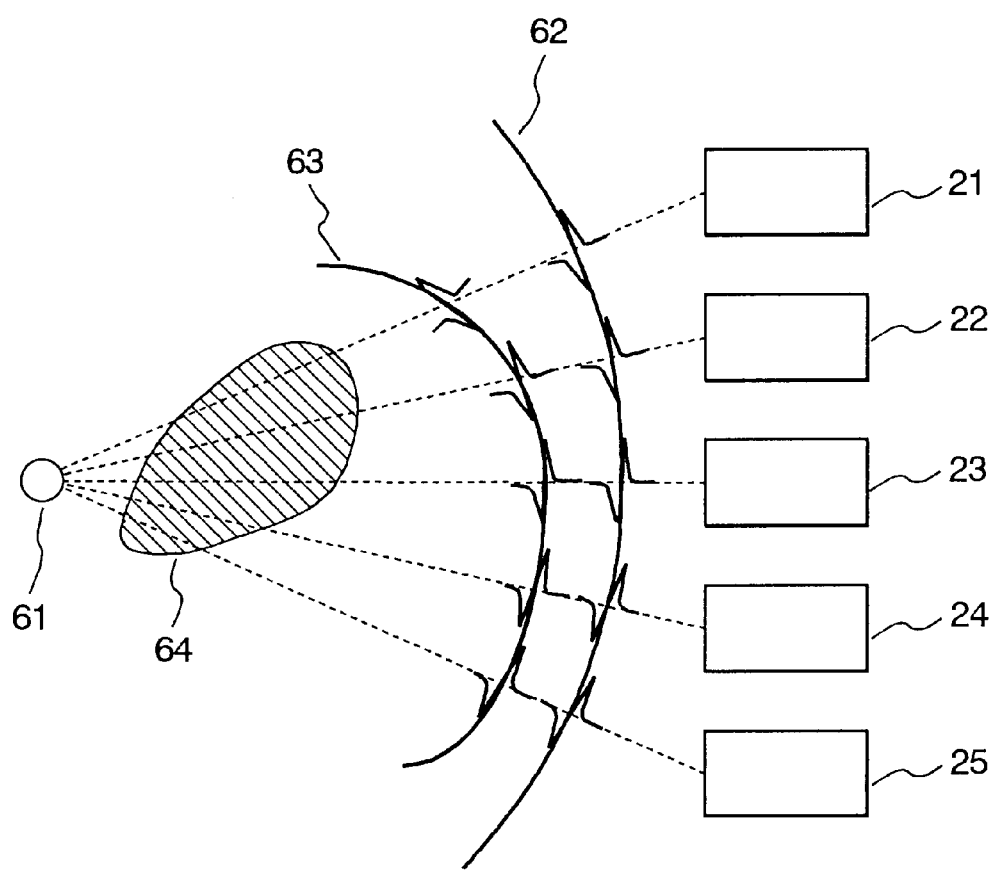
FIG. 2 is a diagram showing reflection pulse wave fronts when a living body is homogeneous and when the living body is inhomogeneous.

FIG. 1 is a constitutional diagram of a ultrasonic diagnosis device showing a third embodiment according to the present invention.

In FIG. 1, the ultrasonic diagnosis deviece comprises a probe 1, a time delay unit 2, an adder unit 3, a computing region input unit 4, a phase difference computing unit 5, a correlation factor computing unit 6, a phase difference storage unit 7, a correlation factor storage unit 8 and a correlation factor comparing unit 9, and a sign judging unit 10.

The operation of probe 1, the time delay unit 2, the adder unit 3, the computing region input unit 4, the phase difference computing unit 5, the correlation factor computing unit 6, the phase difference storage unit 7, the correlation factor storage unit 8 and the correlation factor comparing unit 9 in FIG. 1 are identical as those explained in connection with FIGS. 3 through 8. The operation of FIG. 1 embodiment differs in the following points from that of FIG. 3 embodiment.

Namely, in FIG. 1 embodiment, the phase difference computing unit 5 computes the phase differences according to the formula (2), and the correlation factor computing unit 6 computes the correlation factors according to the formula (5). Thereafter, the sign judging unit 10 examines the sign of the real part, which corresponds to the denominator in the formula (2), of a complex number which is the object of the phase difference computation in the phase difference computing unit 5. More specifically, the examination is realized, for example, by judging whether or not the sign bit of the object data is one or zero. Namely, in the phase difference computing unit 5 digital signal processing is performed, therefore, the judgement between positive and negative signs is determined by digital numbers one and zero.

Resultantly, only when the sign of the real part of the complex number is positive, the sign judging unit 10 issues an operation command to the correlation factor comparing unit 9. When the sign of the real part of the complex number which is the object for the phase difference computation is negative, the correlation factor comparing unit 9 is not operated, and the exchange of the phase difference and the correlation factor are not executed. Namely, by limiting the sign of the real part of the complex number which is the object for the phase difference computation to positive, the phase difference between two signals is limited in a range of more than $-\pi/2$ and less than $\pi/2$, and when the absolute of the phase difference exceeds $\pi/2$, the resultant phase difference is not taken into account, the reason of which will be explained hereinbelow.

Journal of Acoustical Society of America, Vol.90, No.6, pp2924–2931 (Published in 1991) and Ultrasonic Imaging, Vol.14, pp398–414 (Published in 1992) report that an interval inhomogeneities in a living body is, in general, sufficiently larger than the element width of the probes. Therefore, in view of the report in the above documents, it is inconceivable that the absolute value of the phase differences between adjacent signals exceeds $\pi/2$. Accordingly, it is judged that the correlation between signals of the region where the real part of the complex number shows a negative sign is low, even if the correlation factor thereof is large, and the phase differences detected in such a region are treated as data of low reliability and are automatically neglected.

Resultantly, even if the correlation factors are computed according to formula (5) to simplify the structure of the correlation factor computing unit 6, the influences of the phase differences in a region having a low correlation are removed by introducing a simple circuit.

Hereinbelow, supporting data for the accuracy improvement according to the present invention are demonstrated with reference to a simulation result by a computer.

Frequency of the ultrasonic is determined to be 3.5 MHz and the size of the probe is selected to be 14.08 mm×14.08 mm, which is a typical probe specification in a ultrasonic diagnosis device easily available in the market concerned. In this arrangement, in order to prevent a virtual image called as a grating lobe which possibly appears during scanning a body to be inspected, the element width in ultrasonic beam scanning direction has to be selected below $\lambda/2$. Wherein $\lambda$ is a wave length of the ultrasonic wave, and since the frequency of the ultrasonic wave is 3.5 MHz, the wave length $\lambda$=0.44 mm, accordingly, in this simulation number of elements in the ultrasonic beam scanning direction is determined to be 64.

The inhomogeneity in a living body is modeled based on a time movement plane immediately before the front of the probe. The time movement plane causes to move a ultrasonic pulse arrived to the probe along a time axis in positive and negative direction and provides a distortion for the arrival time of the ultrasonic pulse which is analytically determined. Measured values of the time movement plane in a living body sample are described in Ultrasonic Imaging, Vol.14, pp398–414. With regard to the measured time movement plane, a maximum movement time was 130±34 nsec, rms (root mean square) value of the movement time was 55±14 nsec, and a FWHM(full width half maximum)of auto correlation factor of the movement time was 4.2±1.1 mm. In the present simulation by a computer, the time movement plane is generated at random with reference to the above values. With regard to the time movement plane generated by the computer, maximum movement time is 143 nsec, the rms value of the movement time is 55 nsec, and the FWHM of the auto correlation factor of the movement time is 4.4 mm.

Ultrasonic pulses are transmitted from the probe to and received from a point reflector located at a position before 100 mm from the center of the probe, and the time movement plane is estimated based on the correlation computation of the received signals. Ultrasonic beam after correcting in-homogeneity in the living body is introduced based on the estimated error, and a spherical body having a diameter of 10 mm center of which is located at a position before 50 mm from the center of the probe is scanned by the ultrasonic beam to image the same. No reflective bodies exist inside the spherical body and point reflectors are distributed at random and uniformly outside the spherical body.

For the thus constructed image, a ratio between rms value of the image signals outside the spherical body and rms value of the image signals inside the spherical body is determined, and S/N of the slice image is defined. The larger the S/N of the slice image, the better the cotrast of the spherical body which represents a high resolution. Images are constructed for three cases, first case is no inhomogeneities exist, second case is in-homogeneities exist, however no corrections are effected, and third case is correction for inhomogeneities are effected while varying division number in the direction perpendicular to the ultrasonic beam scanning, and the S/N of the slice images thereof are determined.

When effecting correction with the present probe having the division number 1 in the direction perpendicular to the ultrasonic beam scanning, the S/N is improved by 4 dB in comparison with that of before the correction. When effecting correction using division number 8 in the direction perpendicular to the ultrasonic beam scanning, the S/N is improved by 10 dB in comparison with that of before the correction. Further, when effecting correction using division number 16 and more in the direction perpendicular to the ultrasonic beam scanning, the S/N is improved to be comparable with the case where no inhomogeneities exist.

Industrial Possibility of the Invention

According to the present invention as has been explained above, in the ultrasonic diagnosis device in which inhomogeneities in a living body is corrected by making use of the correlation computation, the region of interest for which the correlation computation is to be performed is set and the phase difference of a portion where the largest correlation factor is shown in the region of interest is used automatically as the correction value, thereby, the correction of inhomogeneities in the living body in the region of interest can be effected automatically with a high precision. Further, the correlation factors are determined according to a simple computing formula while limiting the phase differences of the adjacent signals in a range of more than $-\pi/2$ and less than $\pi/2$ and the phase difference of a portion where the largest correlation factor is shown in the region of interest is used automatically as the correlation value, thereby, with the computing circuit having a simple structure, the correction of inhomogeneities in the living body in the region of interest can be effected with a high precision.

We claim:

1. A ultrasonic diagnosis device comprising at least a probe constituted by arrayed elements disposed at a predetermined position which transmit ultrasonic pulses into a body to be inspected and receive the same therefrom, a time delay unit which provides a time delay to received wave signals from the respective elements of the probe, and an adder unit which forms ultrasonic beam by adding output signals from the time delay unit, characterized in that the ultrasonic diagnosis device further comprising, a phase difference computing unit which computes phase differences between the output signals from said time delay unit;

a correlation factor computing unit which computes correlation factors between the output signals from said time delay unit;

a computing region input unit which designates a portion of the output signals as an object of the computations of the phase differences and of the correlation factors;

a phase difference storage unit and a correlation factor storage unit which respectively store the results of the phase difference computation and the correlation factor computation; and a correlation factor comparing unit which compares an output value of said correlation factor computing unit with a stored value in said correlation factor storage unit and, when the output value of said correlation factor computing unit is larger than the stored value in said correlation factor storage unit, causes said phase difference storage unit and said correlation factor storage unit to store respectively the output value of said phase difference computing unit and the output value of said correlation factor computing unit, and further characterized in that, at the moment when the phase difference computation and the correlation factor computation for the portion of the output signals designated by said computing region input unit have been completed, said time delay unit is controlled by making use of the output value stored in said phase difference storage unit.

2. A ultrasonic diagnosis device according to claim 1, characterized in that said adder unit is constituted by a first adder unit which adds the output signals of said time delay unit and a second unit which forms the ultrasonic beam by adding the output signals of said first adder unit, and performs the phase difference computation and the correlation factor computation for the output signals of said first adder unit.

3. A ultrasonic diagnosis device according to claim 1, characterized in that, the phase difference computation and the correlation factor computation are complex number computation, and the ultrasonic diagnosis device further comprises a sign judging unit which is connected to said phase difference computing unit and issues an operation command to said correlation factor comparing unit only when said sign judging unit judges that the real part of complex numbers as an object of the phase difference computation is positive.

4. A ultrasonic diagnosis device according to claim 2, characterized in that, the phase difference computation and the correlation factor computation are complex number computation, and the ultrasonic diagnosis device further comprises a sign judging unit which is connected to said phase difference computing unit and issues an operation command to said correlation factor comparing unit only when said sign judging unit judges that the real part of complex numbers as an object of the phase difference computation is positive.

5. A ultrasonic diagnosis device according to claim 1, characterized in that, said computing region input unit which designates a portion of the output signals as an object of the computations of the phase differences and of the correlation factors inputs four parameters of a correlation window, a correlation window starting position, a correlation window depth direction movement distance and a correlation window raster direction movement distance.

* * * * *